United States Patent
Wang

[11] Patent Number: 6,151,362
[45] Date of Patent: Nov. 21, 2000

[54] JOINT RATE CONTROL FOR STEREOSCOPIC VIDEO CODING

[75] Inventor: Limin Wang, San Diego, Calif.

[73] Assignees: Motorola, Inc., Schaumburg, Ill.; General Instrument Corporation, Horsham, Pa.

[21] Appl. No.: 09/369,624

[22] Filed: Aug. 6, 1999

Related U.S. Application Data

[60] Provisional application No. 60/106,284, Oct. 30, 1998.

[51] Int. Cl.[7] .......................................................... H04N 7/12
[52] U.S. Cl. ........................................ 375/240.12; 348/409
[58] Field of Search .............................. 348/43, 419, 405, 348/584, 409; 375/240.12

[56] References Cited

U.S. PATENT DOCUMENTS

| | | |
|---|---|---|
| 5,291,281 | 3/1994 | Paik et al. ................................ 348/384 |
| 5,510,832 | 4/1996 | Garcia ........................................ 348/43 |
| 5,652,616 | 7/1997 | Chen et al. ................................ 348/43 |
| 5,687,257 | 11/1997 | Paik et al. ................................ 348/405 |
| 5,717,415 | 2/1998 | Iue et al. ...................................... 345/8 |
| 5,719,632 | 2/1998 | Hoang et al. ............................ 348/419 |
| 6,020,931 | 2/2000 | Bilbrey et al. ............................ 348/584 |

*Primary Examiner*—Chris S. Kelley
*Assistant Examiner*—Allen Wong
*Attorney, Agent, or Firm*—Barry R. Lipsitz; Ralph F. Hoppin

[57] ABSTRACT

A method and apparatus are provided for controlling and balancing a quality ratio between left and right channels of a stereoscopic video sequence. A complexity measure for each of the channels is first determined. Thereafter, a number of bits representing the video sequence is allocated between the channels according to each channel's complexity. The resultant joint rate control allows the bit rates for the two channels to vary according to the complexity measures of their pictures, while the aggregate bit rate is maintained at the channel capacity, which is a constant value.

35 Claims, 4 Drawing Sheets

JOINT RATE CONTROL FOR STEREOSCOPIC VIDEO CODING

This application claims the benefit of U.S. provisional application Ser. No. 60/106,284 filed on Oct. 30, 1998.

BACKGROUND OF THE INVENTION

The present invention relates to digital video signal processing techniques which may be used, for example, in connection with digital television, and more particularly to the coding of different channels of a stereoscopic video sequence.

A stereoscopic video sequence consists of two channels, which are referred to as the left and right channels. The two channels can be coded either independently or jointly. In independent coding the two channels are usually coded at the same bit rate, as there is no particular reason why one channel should be coded with fewer bits than the other channel. The same bit rate likely results in similar quality for the two channels because of the similarity between the channels. However, from the compression point of view, independent coding of the two channels of a stereoscopic sequence is not very efficient because it does not exploit the cross-correlation between two channels.

Disparity estimation as permitted by the Moving Picture Experts Group "MPEG-2 Multi-View Profile" employs the cross-correlation between the two channels. In the MPEG-2 Multi-View Profile, one channel (e.g. the left channel) is considered as a base layer and the second channel (e.g. the right channel) an enhancement layer. The base layer channel is coded independently while the enhancement channel is coded based upon the base layer channel. Simulations have demonstrated a better performance when cross-correlation between the left and right channels is utilized.

MPEG defines three picture types in terms of temporal processing. They are the I (intra-frame coded) picture, P (forward temporal predictive coded) picture, and B (bi-directional temporal predictive coded) picture. The input video sequence is often divided into groups of pictures (GoP). Each GoP contains one I picture, a number of P pictures, and optionally a few B pictures between I or P pictures. I pictures are "intraframe" coded pictures, which are not based on any other pictures (frames) in the sequence. P pictures are "predicted" pictures, which are predicted from previous I or P frames. B pictures are "bi-directionally" predicted pictures, which can be predicted from previous and/or future I and/or P pictures.

Prior to the present invention, schemes for stereoscopic video coding typically used a fixed bit rate for each channel. In general, however, the channel (e.g., the right channel) that is coded based on the other channel (e.g., the left channel) needs fewer bits than the independently coded (e.g., left) channel for similar quality. This is because the non-independently coded (e.g., right) channel has additional information for prediction (e.g., the left channel) and it also has no I pictures which typically use many more bits than P and B pictures.

However, even where one channel is coded based on the other, the optimal sharing of a given channel capacity by the two channels still remains a question. The problem is that the cross-correlation between two channels for different stereoscopic materials can be different, and even within a stereoscopic sequence, the degree of correlation between the two channels can also vary from time to time. Hence, a predetermined bit allocation between two channels which might be quite reasonable for some stereoscopic video sequences, or some segments of a stereoscopic sequence, could be very bad for other sequences, or segments of the same stereoscopic sequence, if equal quality between the two channels is the criterion. Thus, it is difficult to maintain similar quality, or to balance the quality, for the two channels by using a fixed bit allocation strategy for stereoscopic video coding.

It would be advantageous to provide a method and apparatus for jointly controlling the bit rate of the two channels provided for stereoscopic video coding. Such a scheme should allow the bit rates of the two channels to vary according to various criteria, while maintaining the aggregate rate at a constant value within the capacity of a communications channel over which the data are communicated.

The present invention provides a method and apparatus having the aforementioned and other advantages.

SUMMARY OF THE INVENTION

In accordance with the present invention, a joint rate control strategy is provided with dynamic bit allocation for stereoscopic video coding. In the joint rate control, the bit rates for the two channels are allowed to vary according to the complexity measures of their pictures, but the aggregate rate is maintained at a constant value within the channel capacity of the communication channel over which the data are carried.

A method in accordance with the invention balances a quality ratio between a plurality of channels of a stereoscopic video sequence. A complexity measure for each of the channels is determined. Then, the number of bits representing the video sequence between the channels is allocated according to each channel's complexity. The allocating step maintains an aggregate bit rate of the video sequence at a substantially constant rate. The constant rate is determined by a channel capacity of a communications channel over which the video sequence is to be communicated.

A corresponding apparatus is also provided.

DETAILED DESCRIPTION OF THE INVENTION

The present invention provides a joint rate control strategy with dynamic bit allocation for stereoscopic video coding. A target bit rate is determined for a joint group of pictures (GoP). Then, the target number of bits T for the joint GoP is distributed over the frames within the joint GoP to determine a target rate for a frame. The same principle can also be applied to the slice level, wherein for a given target number of bits for a frame, a determination is made as to how many bits should be assigned to a slice of the frame. Once the target rates have been determined, rate control is effected, e.g., by adjusting a quantization parameter in the encoder. Each of these steps is discussed in greater detail below.

1. Target Rate for Joint GoP

Figure 1:
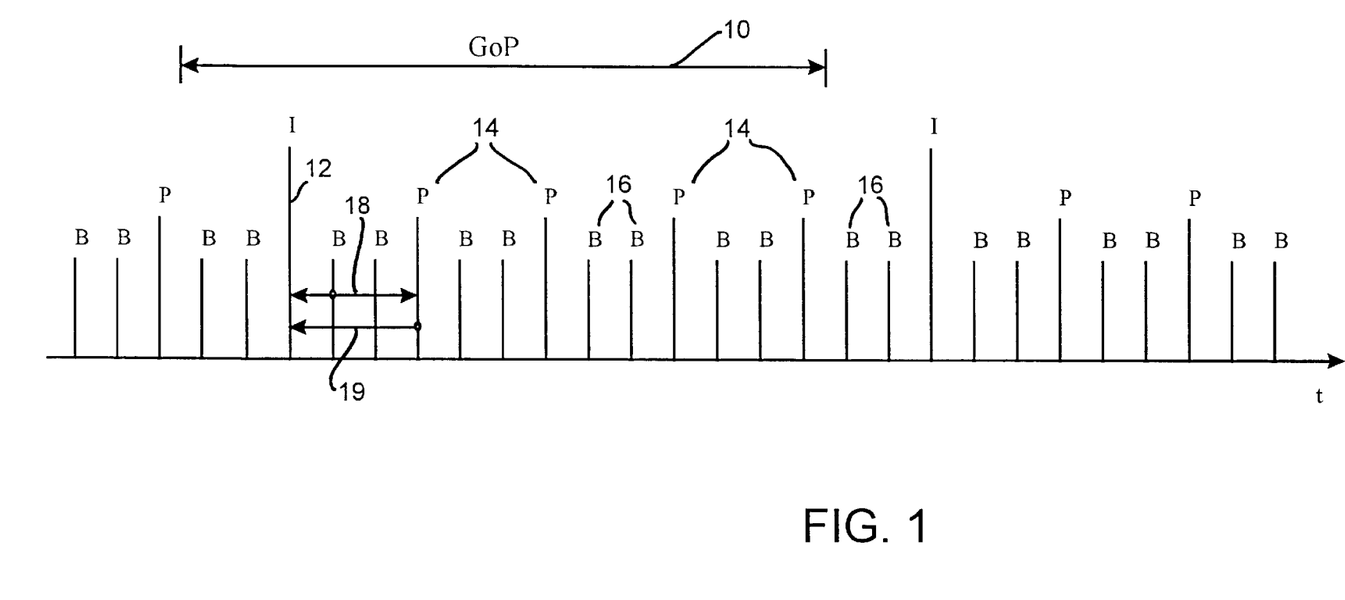
FIG. 1 provides an example of a group of pictures (GoP) structure, with arrows indicating prediction directions.

First, the concept of a joint GoP is introduced for a stereoscopic sequence. FIG. 1 shows an example of a GoP structure generally designated 10, where there are one I picture 12, four P pictures 14 and two B pictures 16 between each pair of consecutive I-P, P-P or P-I pictures. Note that in FIG. 1, the arrows 18 and 19 between the I and P pictures show the prediction directions.

Figure 2:
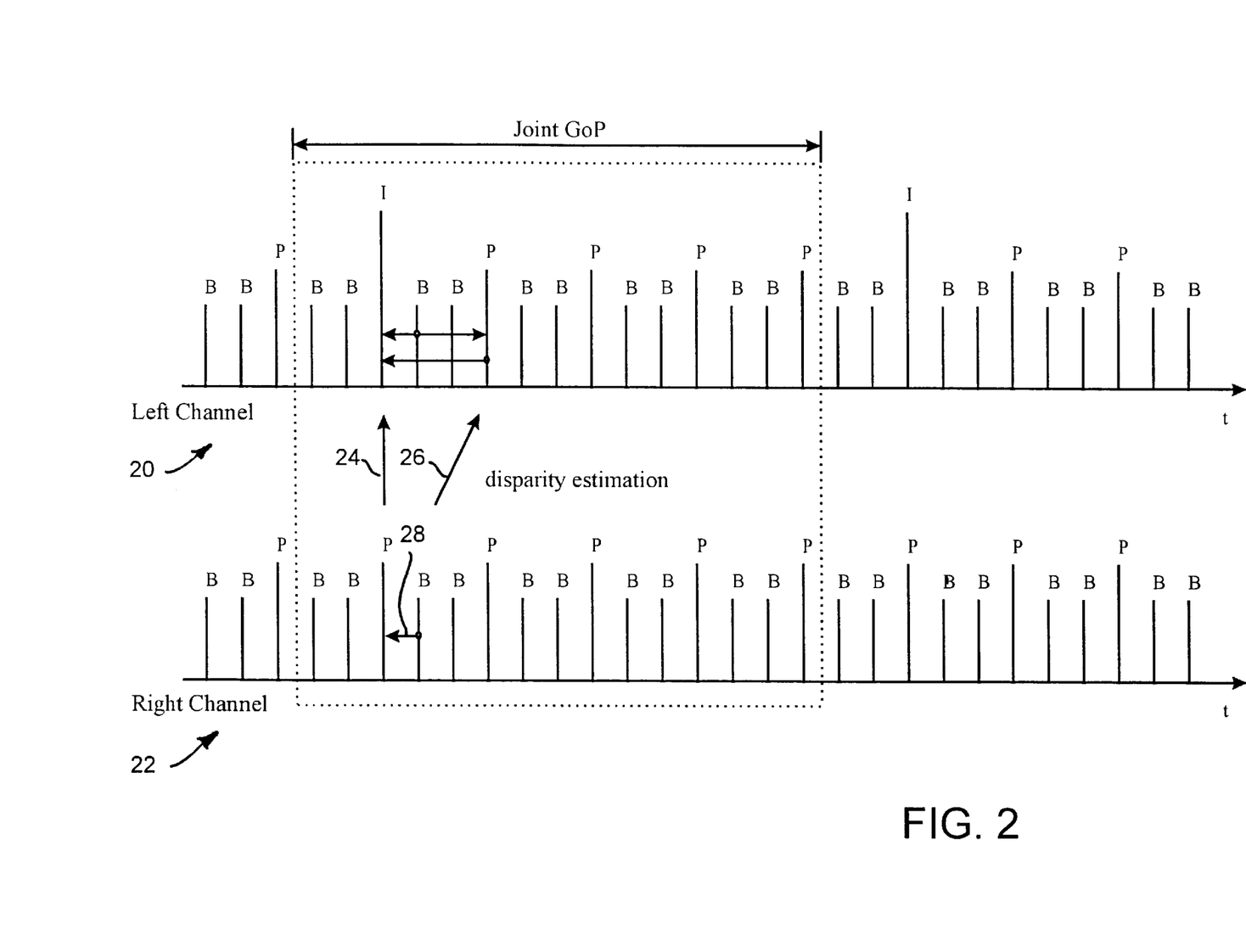
FIG. 2 provides an example of picture types for both channels of a stereoscopic sequence.

A joint GoP as defined herein is actually a collection of two GoPs, one from each channel of the stereoscopic sequence for the same interval. This is illustrated in FIG. 2, which shows an example of picture types (I, P, B) allowed in the MPEG-2 Multi-View Profile, for both the left and right channels 20, 22 respectively, of a stereoscopic video sequence. The left channel 20 is coded independently, and it has all three of the picture types defined in MPEG. However, the right channel 22 is coded based upon the left channel, as indicated by the prediction directions 24, 26 in FIG. 2.

As can be seen, the right channel has no I pictures, but only P and B pictures. Furthermore, P and B pictures in the right channel are different from P and B pictures in the left channel in the nature of prediction. The predictions in P and B pictures for the right channel involve a disparity estimation from the pictures in the left channel. Specifically, the references for P and B pictures in the right-channel can be the pictures in the left-channel. To distinguish the two types of P and B pictures, let us call the P and B pictures in the left channel the left-channel P and B pictures, and the P and B pictures in the right-channel the right channel P and B pictures, respectively. Note that in FIG. 2, the arrows 24, 26 and 28 show the prediction directions. If the GoP length for each channel is N, a joint GoP contains 2N frames. A stereoscopic video sequence of two channels is now divided into joint GoPs. Each joint GoP has the same total number of left channel I pictures, left-channel P and B pictures, and right-channel P and B pictures as every other joint GoP. Hence, the same nominal number of bits can be assigned for each joint GoP, that is:

$$T = 2NR_{channel(bpf)} \quad (1)$$

where:

$R_{channel(bpf)}$ is the channel rate in bits/frame. It is noted that different embodiments are possible where, for example, the I pictures are provided in the right-channel instead of the left-channel.

2. Target Rate for a Frame

Given a target number of bits, T, for a joint GoP, the next step is to distribute the T bits over the frames within the joint GoP. The strategy adopted here is based upon the frame complexity. Similar to Test Model 5 (TM5), as disclosed in ISO/IEC (MPEG-2), "Test Model 5", MPEG 93/457 AVC-491, April 1993 and incorporated herein by reference, a complexity measure for a frame is defined in accordance with the present invention. This complexity measure comprises the product of the (average) quantization parameter (Q) used for the frame and the number of bits (R) generated for the frame by using Q, i.e.:

$$C = QR. \quad (2)$$

Hence, for a joint GoP of 2N frames, there can be 2N complexity measures, one for each of 2N frames, i.e.:

$$C_{m,n} = Q_{m,n} R_{m,n}, \; m=1,2 \text{ and } n=1,2,\ldots,N \quad (3)$$

where m is the channel index (here, "1" is assigned for the left channel and "2" for the right channel) and n is the frame index. Let $T_{m,n}$ be the target number of bits assigned for frame (m,n). The actual rate for frame (m,n), $R_{m,n}$, should be made close to the target rate, $T_{m,n}$, by proper rate control, i.e.:

$$T_{m,n} = R_{m,n} = \frac{C_{m,n}}{Q_{m,n}} \quad (4)$$

Similarly, the total number of bits generated from the 2N frames in each joint GoP should also be close to the nominal target rate for the joint GoP, T, i.e.:

$$T = \sum_{m=1}^{2} \sum_{n=1}^{N} R_{m,n} \quad (5)$$

If equal quality is required, the same quantization parameter should be applied to all of the frames because quantization is the only lossy operation in MPEG video coding. Considering the difference in the three picture types, as in TM5, we can weight the quantization parameter by a constant factor for the different picture types, i.e.:

$$Q_{m,n} = K_{m,n} Q \quad (6)$$

where:

$$K_{m,n} = \begin{cases} K_I & \text{for } I \text{ picture in left channel} \\ K_{lP} & \text{for } P \text{ picture in left channel} \\ K_{lB} & \text{for } B \text{ picture in left channel} \\ K_{rP} & \text{for } P \text{ picture in right channel} \\ K_{rB} & \text{for } B \text{ picture in right channel} \end{cases} \quad (7)$$

In TM5, the constant factors for I and P pictures are equal to 1 and for B pictures the constant factor is 1.4. The quality balance between the two channels can also be controlled by introducing a weighting factor for each channel m, $w_m$, as:

$$Q_{m,n} = w_m K_{m,n} Q \quad (6a)$$

where:

$$w_m = \begin{cases} w_l & \text{for left channel} \\ w_r & \text{for right channel} \end{cases} \quad (8)$$

Equations for $T_{m,n}$ and T can therefore be rewritten as $$T_{m,n} = \frac{1}{Q} \frac{C_{m,n}}{w_m K_{m,n}} \quad (9)$$

and $$T = \sum_{m=1}^{2} \sum_{n=1}^{N} R_{m,n} = \frac{1}{Q} \sum_{m=1}^{2} \sum_{n=1}^{N} \frac{C_{m,n}}{w_m K_{m,n}} \quad (10)$$

From equations (9) and (10), the target number of bits for each frame (m,n) can be determined as:

$$T_m = \frac{\frac{C_{m,n}}{w_m K_{m,n}}}{\sum_{m=1}^{2}\sum_{n=1}^{N}\frac{C_{m,n}}{w_m K_{m,n}}} T \quad (11)$$

Here, the numerator is the weighted complexity measure for frame (m,n) and the denominator is the sum of the weighted complexity measures for all the frames within the current joint GoP.

One concern with the above equation is that in order to determine a target number of bits for a frame, it is necessary to know the complexity measures for all of the frames of the associated joint GoP. This may not be practical, and therefore it is desirable to modify the above equation. To modify the equation, at each frame, the first consideration is only how the remaining number of bits is distributed over the remaining frames in a joint GoP. Secondly, the assumption is made that all of the future frames of the same picture type (I, the left-channel P and B, the right-channel P and B) have the same complexity measure. This is a reasonable assumption for a continuous scene.

Thus, for each picture type, only one complexity measure has to be maintained; $C_I$ for the I picture, $C_{lP}$ for the left-channel P, $C_{lB}$ for the left-channel B, $C_{rP}$ for the right-channel P, and $C_{rB}$ for the right-channel B. The bit allocation strategy therefore becomes:

$$T_{m,n} = \frac{\frac{1}{w_m K_{m,n}}C_{m,n}}{\frac{1}{w_l K_{lI}}C_I N_I + \frac{1}{w_l K_{lP}}C_{lP} N_{lP} + \frac{1}{w_l K_{lB}}C_{lB} N_{lB} + \frac{1}{w_r K_{rP}}C_{rP} N_{rP} + \frac{1}{w_r K_{rB}}C_{rB} N_{rB}} T_r \quad (12)$$

where:

$C_{m,n}$ is the complexity measure for the picture type of frame (m,n) (Note that after encoding a frame, the complexity measure of the corresponding picture type needs to be updated according to equation (2), set forth above), $N_I$, $N_{1P}$, $N_{1B}$, $N_{rP}$ and $N_{rB}$ are, respectively, the number of the remaining I pictures, left-channel P pictures, left-channel B pictures, right-channel P pictures and right-channel B pictures, in the current joint GoP, $T_r$ is the remaining number of bits in the current joint GoP, defined as:

$$T_r = T_r - R_{m',n'}, \quad (13)$$

where $R_{m',n'}$ is the number of bits generated for frame (m',n')—the frame coded just before frame (m,n). The above equation actually indicates how the remaining number of bits is distributed over the remaining frames within a joint GoP. At the beginning of each joint GoP, T, needs to be updated as follows:

$$T_r = T_r + T \quad (14)$$

where T is the nominal number of bits assigned for each joint GoP. The remaining number of bits after encoding the last frame in a joint GoP, $T_r$, can be either a positive or negative number, and it is passed to the next joint GoP by equation (14).

3. Target Rate for a Slice

The principles disclosed above can also be applied to the slice level. For a given target number of bits, $T_{m,n}$, for frame (m,n), it may be necessary to decide how many bits out of $T_{m,n}$, should be assigned to slice s of the frame. Similar to the frame complexity, a slice complexity measure, C, is defined as the product of the (average) quantization parameter Q and the number of bits R generated by using Q for the slice. If a frame contains S slices, there will be S slice complexity measures, i.e.:

$$C_s = Q_s R_s \quad s=1,2 \ldots, S \quad (15)$$

Because of the variation in spatial content of a frame, the S slice complexity measures can be quite different even within the same frame. By using the same methodology, it can be shown that for the same coding distortion, the target number of bits for each slice s of frame (m,n) should be $$T_{m,n,s} = \frac{C_{m,n,s}}{\sum_{s'=s}^{S} C_{m,n,s'}} T_{m,n,r} \quad (16)$$

where $T_{m,n,r}$ is the remaining number of bits up to slice s-1 for frame (m,n), defined as:

$$T_{m,n,r} = T_{m,n} - \sum_{s'=1}^{s-1} R_{s'} \quad (17)$$

and $R_{s'}$ is the number of bits generated for slice s'. It should be pointed out that all of the $C_{m,n,s}$ used in equation (16) can actually be calculated from the previously coded frame of the same type by using equation (15).

4. Buffer Modeling and Protection

The bit allocation strategy according to equation (12) assigns a frame a target rate based upon the frame complexity measure and picture type, as well as the program GOP structure. Hence, both channels may behave more or less like variable bit rate (VBR) video even though the aggregate rate may be constant (for constant-rate channel applications). It is the responsibility of the encoder to prevent both the encoder and decoder buffers from overflowing and underflowing. For constant rate channel applications, encoder buffer modeling and protection is the same as in the constant bit rate (CBR) case. However, the decoder may only be able to decode the base layer channel (e.g. the left channel) which is VBR. Decoder buffer modeling and protection for VBR video is a challenging issue. It is possible to achieve decoder buffer protection by applying additional constraints on the target rate of frames.

Figure 3:
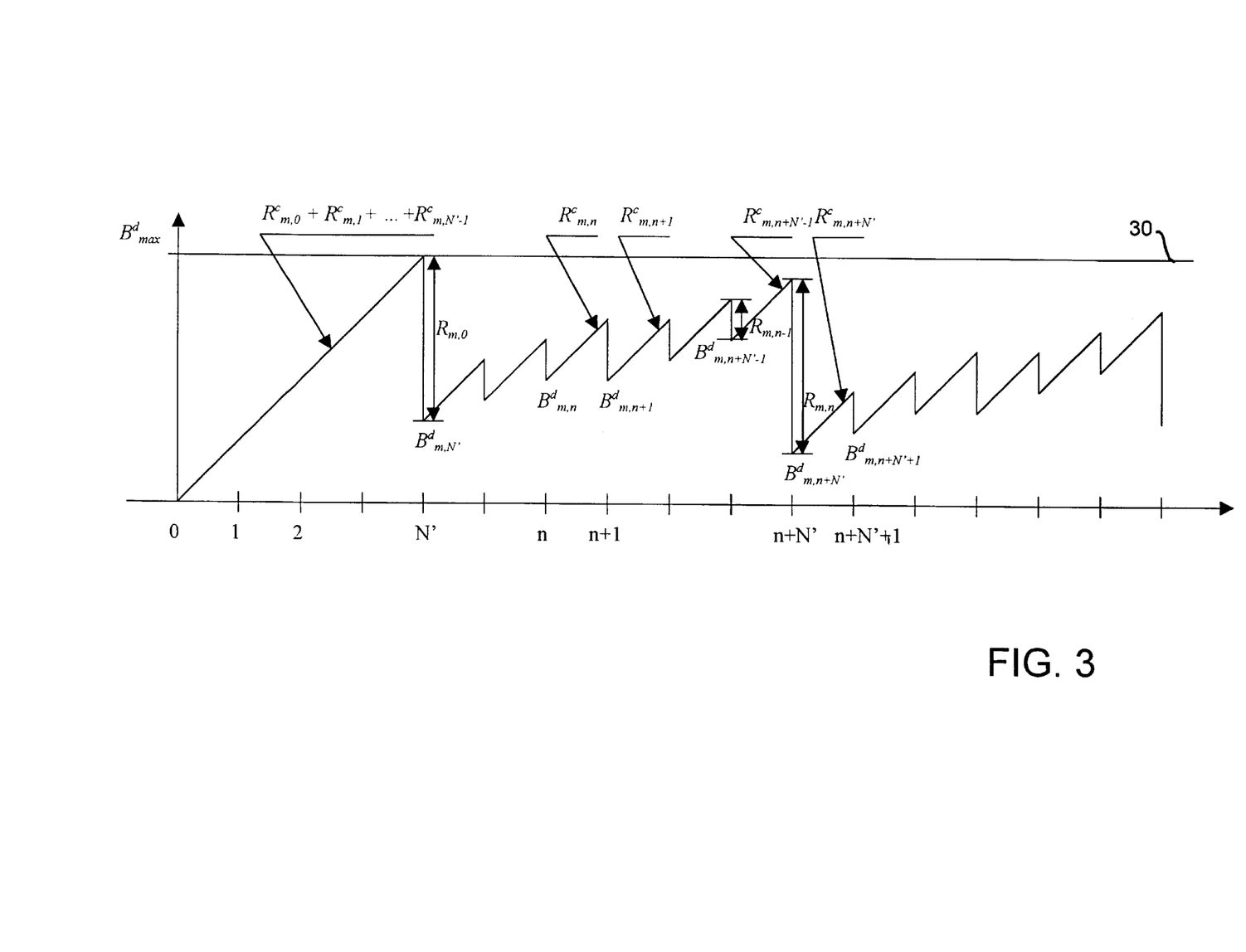
FIG. 3 illustrates the fullness of a decoder buffer over time under control of the present invention.

For purposes of explanation, it is assumed that the decoder can only decode the base layer channel (e.g. the left channel) of m=1. Only the packets of the selected channel will be extracted and decoded. Further, it is assumed that the decoding delay is N' frames. The quantity $$R^c_{m,n}$$

is defined as the number of bits transmitted for channel m during the nth frame period, as shown in FIG. 3. The decoder buffer will therefore be filled up to $$\sum_{n=0}^{N'-1} R^c_{m,n}$$

before any bits are moved out. This is depicted in FIG. 3, where it can be seen that the quantity of data in the buffer is maintained between zero and an upper threshold 30 which corresponds to a full buffer. At the frame instant of n+N', the compressed bits for frame n, $R_{m,n}$, are moved out the decoder buffer and moved into the decoder instantaneously, and between the frame instants of n+N' and n+N'+1, the decoder buffer receives $$R_{m,n+N'}^c$$

bits from the network, also shown in FIG. 3.

Let $$B_{m,n+N'}^d$$

be the decoder buffer fullness at the frame instant of n+N', after the compressed bits for frame n are moved out (FIG. 3). Clearly, $$B_{m,n+N'}^d$$

is a local minimum and has to be equal to, or greater than, zero, i.e., $$0 \le B_{m,n+N'}^d \quad (18)$$

Furthermore, the buffer fullness right before the frame instant of n+N'+1 is $$B_{n,n+N'}^d + R_{m,n+N'}^c,$$

as shown in FIG. 3. This is the local maximum and has to be equal to, or smaller than, the maximum decoder buffer size, say $$B_{\max}^d,$$

that is $$B_{m,n+N'}^d + R_{m,n+N'}^c \le B_{\max}^d \quad (19)$$

From (18) and (19), we have, $$0 \le B_{m,n+N'}^d \le -R_{m,n+N'}^c + B_{\max}^d \quad (20)$$

The buffer fullness at the frame instant of n+N', $$B_{m,n+N'}^d,$$

(FIG. 3) can be given as:

$$B_{m,n+N'}^d = B_{m,n+N'-1}^d + R_{m,n+N'-1}^c - R_{m,n} \quad n = 1, 2, \ldots \quad (20a)$$

$$= B_{m,N'}^d + \sum_{n'=0}^{n-1} R_{m,n'+N'}^c - \sum_{n'=1}^{n} R_{m,n'} \quad (20b)$$

$$= \left( \sum_{n'=0}^{N'-1} R_{m,n'}^c - R_{m,0} \right) + \sum_{n'=N'}^{n+N'-1} R_{m,n'}^c - \sum_{n'=1}^{n} R_{m,n'} \quad (20c)$$

$$= \sum_{n'=n}^{n+N'-1} R_{m,n'}^c + \left( \sum_{n'=0}^{n-1} R_{m,n'}^c - \sum_{n'=0}^{n-1} R_{m,n'} \right) - R_{m,n} \quad (20d)$$

$$= \sum_{n'=n}^{n+N'-1} R_{m,n'}^c - B_{m,n}^e - R_{m,n} \quad (20e)$$

where $$B_{m,n}^e = \sum_{n'=0}^{n-1} R_{m,n'} - \sum_{n'=0}^{n-1} R_{m,n'}^c \quad (21)$$

can be considered as the fullness of a virtual encoder buffer at the frame instant of n for channel m. From (18) and (20), we have:

$$0 \le \sum_{n'=n}^{n+N'-1} R_{m,n'}^c - B_{m,n}^e - R_{m,n} \le -R_{m,n+N'}^c + B_{\max}^d \quad (22)$$

or $$\sum_{n'=n}^{n+N'} R_{m,n'}^c - B_{m,n}^e - B_{\max}^d \le R_{m,n} \le \sum_{n'=n}^{n+N'-1} R_{m,n'}^c - B_{m,n}^e \quad (23)$$

This is a constraint on the number of bits for frame n of channel m. If the target rate for a frame can be met, the constraint on rate for a frame can be translated into the constraint on target rate for the frame, i.e., $$\sum_{n'=n}^{n+N'} R_{m,n'}^c - B_{m,n}^e - B_{\max}^d \le T_{m,n} \le \sum_{n'=n}^{n+N'-1} R_{m,n'}^c - B_{m,n}^e \quad (24)$$

Hence, before starting to encode frame n of channel m, a determination is made as to whether its target rate is within the proper range, and if not, the target rate is adjusted using the following equation (25):

$$T_{m,n} = \begin{cases} \sum_{n'=n}^{n+N'} R_{m,n'}^c - B_{m,n}^e - B_{\max}^d & \text{if} \quad T_{m,n} < \sum_{n'=n}^{n+N'} R_{m,n'}^c - B_{m,n}^e - B_{\max}^d \\ \sum_{n'=n}^{n+N'-1} R_{m,n'}^c - B_{m,n}^e & \text{if} \quad T_{m,n} > \sum_{n'=n}^{n+N'-1} R_{m,n'}^c - B_{m,n}^e \\ T_{m,n} & \text{otherwise} \end{cases}$$

Note that $$B_{m,n}^e$$

is the fullness of a virtual encoder buffer for channel m at the frame instant of n, defined in (21), and it is available. On the other hand, the transmission rates for channel m during the intervals of the future frames, $$R^c_{m,n'}, n' = n, n+1, \ldots, n+N',$$

can be pre-determined. In order to determine the transmission rate of each channel, the strategy adopted to is to make:
(a) the average input rate to the decoder buffer equal to the average output rate, and
(b) the total transmission rate of the two channels equal to the channel rate.

Specifically, the transmission rate for frame n of channel m is set equal to the average number of compressed bits for the N previous frames that are most recently moved out the decoder buffer (FIG. 3), i.e., $$R^c_{m,n'} = \frac{1}{N} \sum_{n''=n'-N'-N+1}^{n'-N'} R_{m,n''} \quad n' = n, n+1, \ldots, n+N' \quad (26)$$

where N is the joint GOP length. Clearly, the average input rate to the decoder buffer is equal to the average output rate. The total transmission rate of the two channels for any frame period of n, $$\sum_{m=1}^{2} R^c_{m,n'}$$

is also equal to the channel rate, $2R_{channel(bpf)}$, i.e., $$\sum_{m=1}^{2} R^c_{m,n'} = \sum_{m=1}^{2} \left( \frac{1}{N} \sum_{n''=n'-N'-N+1}^{n'-N'} R_{m,n''} \right) \quad (27a)$$

$$= \frac{1}{N} \left( \sum_{m=1}^{2} \sum_{n''=n'-N'-N+1}^{n'-N'} R_{m,n''} \right) \quad (27b)$$

$$= \frac{1}{N} T = 2 \frac{1}{2N} T = 2R_{channel(bpf)} \quad (27c)$$

With the future transmission rates defined in (26), all the terms in the upper bound for frame n of channel m, $$\sum_{n'=n}^{n+N'-1} R^c_{m,n'} - B^e_{m,n'}$$

in (23) and (24) are available at the frame instant of n, or the upper bound can be calculated based upon the information of the previous frames n-1, n-2, . . . However, in the lower bound of $$\sum_{n'=n}^{n+N'} R^c_{m,n'} - B^e_{m,n} - B^d_{max}$$

in (23) and (24), the term $$R^c_{m,n+N'} = \frac{1}{N}(R_{m,n-N+1} + \ldots + R_{m,n-1} + R_{m,n})$$

requires the information on the number of bits for frame n, $R_{m,n}$, which is not available yet at the frame instant of n. By substituting (26) into the lower bound in (23), we have $$\sum_{n'=n}^{n+N'-1} R^c_{m,n'} + \frac{1}{N} \left( \sum_{n''=n-N+1}^{n-1} R_{m,n''} + R_{m,n} \right) - B^e_{m,n} - B^d_{max} \le R_{m,n} \quad (28)$$

or $$\sum_{n'=n}^{n+N'-1} R^c_{m,n'} + \frac{1}{N} \sum_{n''=n-N+1}^{n-1} R_{m,n''} - B^e_{m,n} - B^d_{max} \le \left(1 - \frac{1}{N}\right) R_{m,n} \quad (29)$$

The lower bound for frame n of channel m can therefore be written as:

$$\frac{N}{N-1} \left( \sum_{n'=n}^{n+N'-1} R^c_{m,n'} + \frac{1}{N} \sum_{n''=n-N+1}^{n-1} R_{m,n''} - B^e_{m,n} - B^d_{max} \right) \le R_{m,n} = \quad (30)$$

$$T_{m,n}$$

where all the associated terms in the lower bound are now measurable at the frame instant of n.

5. Rate Control

Once target rates have been determined, the next step in accordance with the invention is to meet these target rates. This can be achieved, for example, by adjusting the quantization parameter (Q) in an MPEG encoder. The Q can be adjusted on a macroblock-by-macroblock basis according to the channel buffer fullness, as in TM5; however, this may result in a non-uniform picture quality over a frame as discussed in L. Wang, "Bit rate control for MPEG video coding", Proc. SPIE on Visual Comm. And Image Processing, pp. 53–64, May, 1995. For example, two identical blocks in a frame may be assigned different quantization parameters just because of the different buffer fullness levels at different times, and therefore are quantized to different quality. An alternative is to use a global quantization parameter for all of the macroblocks in a frame. In this case, identical blocks will be assigned the same quantization parameter and are quantized to the same quality. The global quantization parameter is selected so that the resulting rate is closest to the target rate. The rate control issue then becomes how to find such a global quantization parameter. An iterative algorithm which moves the quantization parameter one step closer to the optimal level at each iteration is presented in L. Wang, "Bit rate control for hybrid DPCM/DCT video codec", IEEE *Trans. CSVT*, vol. 4, pp. 509–517, October 1994. When starting with the quantization parameter used for the previous frame of the same type, the iteration algorithm often needs only one or two steps to reach the best quantization parameter. However, it may take many steps to reach the optimal parameter for the frames at scene cuts. A binary search algorithm which guarantees the best quantization parameter in five steps is disclosed in L. Wang, "Bit rate control for MPEG video coding", Proc. SPIE on *Visual Comm. And Image Processing*, pp. 53–64, May, 1995. Both the iterative and binary algorithms are, however, multi-pass processes, each process involving one quantization and one variable length coding step. Hence, they require more operations than TM5. However, the use of a proper global quantization parameter for a frame usually results in a better subjective picture quality than TM5.

Figure 4:
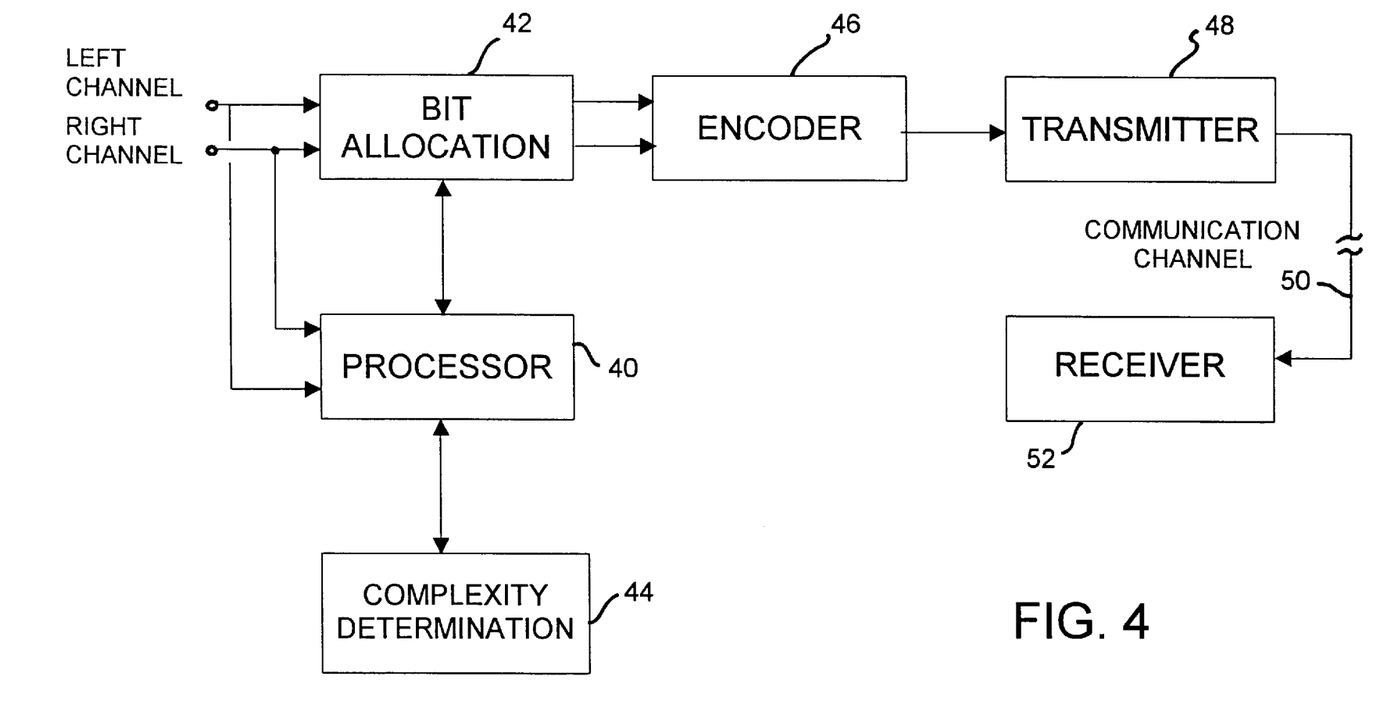
FIG. 4 is a block diagram illustrating apparatus in accordance with the invention.

A block diagram of apparatus for implementing the invention is provided in FIG. 4. It is noted that the apparatus illustrated in FIG. 4 is for purposes of example only, and that other implementations are possible.

Left and right channel data are provided to a computer processor 40 and a bit allocation function 42. The processor 40, in cooperation with a complexity determination function 44, provides a complexity measure for each channel. The complexity measure is passed by processor 40 to the bit allocation function 42, which allocates a number of bits to each of the left and right channels based on the complexity of each channel and the channel capacity of a communication channel 50 over which the data will ultimately be communicated. The bit allocated left and right channel data (which is typically fewer bits than the original left and right channel data input to processor 40) is provided to an encoder 46. The encoder encodes the data in a conventional manner for transmission, e.g., by compressing the data and providing error correction information as well known in the art. The encoded data is provided to a transmitter 48, which provides a data stream for communication to a receiver 52 over channel 50. As will be appreciated by those skilled in the art, the transmitter will modulate the data onto a suitable carrier if the data is to be communicated at other than baseband.

It should now be appreciated that the present invention provides a mechanism for controlling and balancing the quality ratio between the two channels of stereoscopic video sequences. In particular, the bits between the two channels are dynamically allocated according to their corresponding complexity. It is noted that the complexity measure C can be any complexity measure of a frame, and is not limited to the product of Q and R as set forth in the illustrated embodiment.

Although the invention has been described herein in connection with various preferred embodiments, it should be appreciated that various modifications and adaptations may be made thereto without departing from the scope of the invention as set forth in the following claims.

What is claimed is:

1. A method for balancing a quality ratio between a plurality of channels of a stereoscopic video sequence, comprising the steps of:
   determining a complexity measure for each of said channels;
   wherein said channels comprise successive image frames of said stereoscopic video sequence, including a first channel comprising a base layer, and a second channel comprising an enhancement layer;
   allocating a number of bits representing said video sequence between said channels according to each channel's complexity;
   grouping a number of frames of the first and second channels into successive respective groups of pictures (GOPs); and
   forming successive joint groups of pictures (GOPs) from corresponding GOPs of the first and second channels; wherein:
   each joint GOP includes the same number of I, P and B pictures from the first channel, and P and B pictures from the second channel; and
   said allocating step allocates the same target number of bits to each joint GOP.

2. A method in accordance with claim 1, wherein said allocating step maintains an aggregate bit rate of the video sequence at a substantially constant rate.

3. A method in accordance with claim 2, wherein said constant rate is determined by a channel capacity of a communications channel over which said video sequence is to be communicated.

4. A method in accordance with claim 1 wherein:
   the complexity measure of each channel is based on the complexity (C) of the image frames carried by the channel.

5. A method in accordance with claim 4 wherein:
   the successive image frames of the first channel comprise I, P and B pictures; and
   the successive image frames of the second channel comprise only P and B pictures.

6. A method in accordance with claim 5 wherein:
   a complexity measure C, is maintained for I pictures;
   a complexity measure $C_{1P}$ is maintained for the first channel P pictures;
   a complexity measure $C_{1B}$ is maintained for the first channel B pictures;
   a complexity measure $C_{2P}$ is maintained for the second channel P pictures; and
   a complexity measure $C_{2B}$ is maintained for the second channel B pictures.

7. A method in accordance with claim 6, wherein: said allocating step is responsive to a target number of bits ($T_{m,n}$) determined as:

$$T_{m,n} = \frac{\frac{1}{w_m K_{m,n}} C_{m,n}}{\frac{1}{w_1 K_I} C_I N_I + \frac{1}{w_1 K_{1P}} C_{1P} N_{1P} + \frac{1}{w_1 K_{1B}} C_{1B} N_{1B} + \frac{1}{w_2 K_{2P}} C_{2P} N_{2P} + \frac{1}{w_2 K_{2B}} C_{2B} N_{2B}} T_r$$

where:
$C_{m,n}$ is the complexity measure for the picture type of frame (m,n),
m is a channel index and n is a frame index,
subscripts I, P and B denote, respectively, I, P and B pictures,
subscripts 1 and 2 denote, respectively, the first and second channel,
$N_I$, $N_{1P}$, $N_{1B}$, $N_{2P}$ and $N_{2B}$ are, respectively, the number of remaining I pictures, first-channel P pictures, first-channel B pictures, second-channel P pictures and second-channel B pictures in the joint GoP,
w denotes a quality balance weighting factor,
K denotes a quantization parameter weighting factor, and
$T_r$ is the remaining number of bits in the joint GoP, defined as $T_r = T_r - R_{m',n'}$, where $R_{m',n'}$ is the number of bits generated for a frame (m',n') coded just before frame (m,n).

8. A method in accordance with claim 1 wherein:
   each image frame is divided into a plurality of slices; and
   the complexity measure of each channel is based on the complexity (C) of the image frame slices carried by the channel.

9. A method in accordance with claim 1 wherein:
   the complexity measure of each channel is based on the complexity (C) of the image frames carried by the channel; and
   said allocating step is responsive to a target bit rate $T_{m,n}$ assigned to each frame based on the complexity (C) of the frame, where m is a channel index and n is a frame index;
   said method comprising the further step of controlling said target bit rate to prevent the underflow and overflow of buffers in a video encoder processing said video image and a video decoder receiving said video image.

10. A method in accordance with claim 9, wherein said target bit rate is adjusted in accordance with variable lower and upper bounds for each frame.

11. A method in accordance with claim 1, wherein:
the base layer is coded independently, and the enhancement layer is coded, at least in part, based on the first channel.

12. Apparatus for balancing a quality ratio between a plurality of channels of a stereoscopic video sequence, comprising:
a processor adapted to determine a complexity measure for each of said channels;
wherein said channels comprise successive image frames of said stereoscopic video sequence, including a first channel comprising a base layer, and a second channel comprising an enhancement layer;
means for allocating a number of bits representing said video sequence between said channels according to each channel's complexity;
means for grousing a number of frames of the first and second channels into successive respective groups of pictures (GOPs); and
means for forming successive joint groups of pictures (GOPs) from corresponding GOPs of the first and second channels;
wherein each joint GOP includes the same number of I, P and B pictures from the first channel, and P and B pictures from the second channel; and
said allocating means allocates the same target number of bits to each joint GOP.

13. Apparatus in accordance with claim 12, wherein said allocating means maintains an aggregate bit rate of the video sequence at a substantially constant rate.

14. Apparatus in accordance with claim 13, wherein said constant rate is determined by a channel capacity of a communications channel over which said video sequence is to be communicated.

15. An apparatus in accordance with claim 12, wherein:
the base layer is coded independently, and the enhancement layer is coded, at least in part, based on the first channel.

16. A method for balancing a quality ratio between a plurality of channels of a stereoscopic video sequence, comprising the steps of:
determining a complexity measure for each of said channels; and
allocating a number of bits representing said video sequence between said channels according to each channel's complexity; wherein:
said channels carry successive image frames of said stereoscopic video sequence;
the complexity measure of a channel is based on the complexity (C) of the image frames carried by the channel; and
the complexity (C) of an image frame comprises the product of an average quantization parameter (Q) used for that frame and the number of bits (R) generated when that frame is quantized using the quantization parameter Q.

17. A method in accordance with claim 16 wherein said allocating step is responsive to a target number of bits ($T_{m,n}$) assigned to each frame based on the complexity (C) of the frame, where m is a channel index and n is a frame index.

18. A method in accordance with claim 17, comprising the further steps of:
grouping a number N of frames of each channel into a respective group of pictures (GoP) for the channel;

forming a joint GoP from corresponding GoPs of first and second channels, said joint GoP comprising 2N frames; and
determining a nominal target number of bits (T) for the joint GoP;
wherein said allocating step is responsive to said nominal target number of bits (T).

19. A method in accordance with claim 17 comprising the further step of:
determining whether the target number of bits assigned to a particular frame is within a predetermined range and, if not, adjusting the target rate to be within said range prior to encoding that particular frame.

20. A method in accordance with claim 16 comprising the further step of independently weighting the quantization parameter (Q) for each different type of image frame and the particular channel in which the image frame is carried.

21. A method for balancing a quality ratio between a plurality of channels of a stereoscopic video sequence, comprising the steps of:
(a) determining a complexity measure for each of said channels;
(b) allocating a number of bits representing said video sequence between said channels according to each channel's complexity; wherein:
said channels carry successive image frames of said stereoscopic video sequence;
the complexity measure of a channel is based on the complexity (C) of the image frames carried by the channel;
the successive image frames of a first channel comprise I, P and B pictures;
the successive image frames of a second channel comprise only P and B pictures;
a complexity measure $C_I$ is maintained for I pictures;
a complexity measure $C_{1P}$ is maintained for the first channel P pictures;
a complexity measure $C_{1B}$ is maintained for the first channel B pictures;
a complexity measure $C_{2P}$ is maintained for the second channel P pictures; and
a complexity measure $C_{2B}$ is maintained for the second channel B pictures;
(c) grouping a number of frames of each channel into a respective group of pictures (GoP) for the channel; and
(d) forming a joint GoP from corresponding GoPs of said first and second channels;
wherein said allocating step is responsive to a target number of bits ($T_{m,n}$) determined as:

$$T_{m,n} = \frac{\frac{1}{w_m K_{m,n}} C_{m,n}}{\frac{1}{w_1 K_I} C_I N_I + \frac{1}{w_1 K_{1P}} C_{1P} N_{1P} + \frac{1}{w_1 K_{1B}} C_{1B} N_{1B} + \frac{1}{w_2 K_{2P}} C_{2P} N_{2P} + \frac{1}{w_2 K_{2B}} C_{2B} N_{2B}} T_r$$

where:
$C_{m,n}$ is the complexity measure for the picture type of frame (m,n),
m is a channel index and n is a frame index,
subscripts I, P and B denote, respectively, I, P and B pictures, subscripts 1 and 2 denote, respectively, the first and second channels, $N_I$, $N_{1P}$, $N_{1B}$, $N_{2P}$ and $N_{2B}$ are, respectively, the number of remaining I pictures, first-channel P pictures, first-channel B pictures, second-channel P pictures and second-channel B pictures in the joint GoP, w denotes a quality balance weighting factor, K denotes a quantization parameter weighting factor, and $T_r$ is the remaining number of bits in the joint GoP, defined as $T_r = T_r - R_{m',n'}$, where $R_{m',n'}$ is the number of bits generated for a frame (m',n') coded just before frame (m,n).

22. A method for balancing a quality ratio between a plurality of channels of a stereoscopic video sequence, comprising the steps of:

determining a complexity measure for each of said channels; and allocating a number of bits representing said video sequence between said channels according to each channel's complexity; wherein:

said channels carry successive image frames of said stereoscopic video sequence, each image frame being divided into a plurality of slices;

the complexity measure of a channel is based on the complexity (C) of the image frame slices carried by the channel; and the complexity (C) of an image frame slice comprises the product of a quantization parameter (Q) used for that slice and the number of bits (R) generated when that slice is quantized using the quantization parameter Q.

23. A method in accordance with claim 22 wherein said allocating step is responsive to a target number of bits ($T_{m,n,s}$) assigned to each slice based on the complexity (C) of the slice, where m is a channel index, n is a frame index, and s is a slice index.

24. A method in accordance with claim 23, wherein:

each image frame is divided into S slices resulting in S slice complexity measures for each frame; and the target number of bits ($T_{m,n,s}$) for each slice s of a frame (m,n) is:

$$T_{m,n,s} = \frac{C_{m,n,s}}{\sum_{s'=s}^{S} C_{m,n,s'}} T_{m,n,r}$$

where:

$T_{m,n,r}$ is a remaining number of bits up to slice s-1 for frame (m,n), defined as:

$$T_{m,n,r} = T_{m,n} - \sum_{s'=1}^{s-1} R_{s'}, \text{ and}$$

$R_{s'}$ is a number of bits generated for slice s'.

25. A method in accordance with claim 24, wherein the complexity measures $C_{m,n,s}$ are calculated from a previously coded frame of the same type as the current frame by multiplying the quantization parameter Q for each slice by the number of bits R in that slice.

26. A method for balancing a quality ratio between a plurality of channels of a stereoscopic video sequence, comprising the steps of:

(a) determining a complexity measure for each of said channels; and (b) allocating a number of bits representing said video sequence between said channels according to each channel's complexity; wherein:

said channels carry successive image frames of said stereoscopic video sequence;

the complexity measure of a channel is based on the complexity (C) of the image frames carried by the channel; and said allocating step is responsive to a target bit rate $T_{m,n}$ assigned to each frame based on the complexity (C) of the frame, where m is a channel index and n is a frame index; and (c) controlling said target bit rate to prevent the underflow and overflow of buffers in a video encoder processing said video image and a video decoder receiving said video image; wherein:

said target bit rate is adjusted in accordance with variable lower and upper bounds for each frame;

said target bit rate is maintained within said lower and upper bounds according to the parameters $$T_{m,n} = \frac{N}{N-1}\left(\sum_{n'=n}^{n+N'-1} R^c_{m,n'} + \frac{1}{N}\sum_{n''=n-N+1}^{n-1} R_{m,n''} - B^e_{m,n} - B^d_{max}\right) \leq R_{m,n}$$

if $T_{m,n} < \sum_{n'=n}^{n+N'} R^c_{m,n'} - B^e_{m,n} - B^d_{max}$ or $$\sum_{n'=n}^{n+N'-1} R^c_{m,n'} - B^e_{m,n} \text{ if } T_{m,n} > \sum_{n'=n}^{n+N'-1} R^c_{m,n'} - B^e_{m,n}$$

or $T_{m,n}$ otherwise, the quantity 2N is the number of frames in a joint group of pictures (GOP), $R^c_{m,n}$ is the number of bits transmitted for channel m during the nth frame period, $B^e_{m,n}$ is the fullness of a virtual encoder buffer for channel m at the frame instant of n, $B^d_{max}$ is the maximum fullness of a decoder buffer of said video decoder, and N' is a decoding delay of said video decoder; and all of the terms in the lower bound are determinable at the video encoder.

27. An apparatus for balancing a quality ratio between a plurality of channels of a stereoscopic video sequence, comprising:

means for determining a complexity measure for each of said channels; and means for allocating a number of bits representing said video sequence between said channels according to each channel's complexity; wherein:

said channels carry successive image frames of said stereoscopic video sequence;

the complexity measure of a channel is based on the complexity (C) of the image frames carried by the channel; and the complexity (C) of an image frame comprises the product of an average quantization parameter (Q) used for that frame and the number of bits (R) generated when that frame is quantized using the quantization parameter Q.

28. An apparatus for balancing a quality ratio between a plurality of channels of a stereoscopic video sequence, comprising:

means for determining a complexity measure for each of said channels;

means for allocating a number of bits representing said video sequence between said channels according to each channel's complexity; wherein:

said channels carry successive image frames of said stereoscopic video sequence;

the complexity measure of a channel is based on the complexity (C) of the image frames carried by the channel;

the successive image frames of a first channel comprise I, P and B pictures;

the successive image frames of a second channel comprise only P and B pictures;

a complexity measure $C_I$ is maintained for I pictures;

a complexity measure $C_{1P}$ is maintained for the first channel P pictures;

a complexity measure $C_{1B}$ is maintained for the first channel B pictures;

a complexity measure $C_{2P}$ is maintained for the second channel P pictures; and a complexity measure $C_{2B}$ is maintained for the second channel B pictures;

means for grouping a number of frames of each channel into a respective group of pictures (GoP) for the channel; and means for forming a joint GoP from corresponding GoPs of said first and second channels, said joint GoP comprising 2N frames;

wherein said allocating means is responsive to a target number of bits ($T_{m,n}$) determined as:

$$T_{m,n} = \frac{\frac{1}{w_m K_{m,n}} C_{m,n}}{\frac{1}{w_1 K_I} C_I N_I + \frac{1}{w_1 K_{1P}} C_{1P} N_{1P} + \frac{1}{w_1 K_{1B}} C_{1B} N_{1B} + \frac{1}{w_2 K_{2P}} C_{2P} N_{2P} + \frac{1}{w_2 K_{2B}} C_{2B} N_{2B}} T_r$$

where:

$C_{m,n}$ is the complexity measure for the picture type of frame (m,n), m is a channel index and n is a frame index, subscripts I, P and B denote, respectively, I, P and B pictures, subscripts 1 and 2 denote, respectively, the first and second channels, $N_I$, $N_{1P}$, $N_{1B}$, $N_{2P}$ and $N_{2B}$ are, respectively, the number of remaining I pictures, first-channel P pictures, first-channel B pictures second-channel P pictures and second-channel B pictures in the joint GoP, w denotes a quality balance weighting factor, K denotes a quantization parameter weighting factor, and $T_r$ is the remaining number of bits in the joint GoP, defined as $T_r = T_r - R_{m',n'}$, where $R_{m',n'}$ is the number of bits generated for a frame (m',n') coded just before frame (m,n).

29. An apparatus for balancing a quality ratio between a plurality of channels of a stereoscopic video sequence, comprising:

means for determining a complexity measure for each of said channels; and means for allocating a number of bits representing said video sequence between said channels according to each channel's complexity; wherein:

said channels carry successive image frames of said stereoscopic video sequence, each image frame being divided into a plurality of slices;

the complexity measure of a channel is based on the complexity (C) of the image frame slices carried by the channel; and the complexity (C) of an image frame slice comprises the product of a quantization parameter (Q) used for that slice and the number of bits (R) generated when that slice is quantized using the quantization parameter Q.

30. An apparatus for balancing a quality ratio between a plurality of channels of a stereoscopic video sequence, comprising:

means for determining a complexity measure for each of said channels; and means for allocating a number of bits representing said video sequence between said channels according to each channel's complexity; wherein:

said channels carry successive image frames of said stereoscopic video sequence;

the complexity measure of a channel is based on the complexity (C) of the image frames carried by the channel; and said allocating means is responsive to a target bit rate $T_{m,n}$ assigned to each frame based on the complexity (C) of the frame, where m is a channel index and n is a frame index; and means for controlling said target bit rate to prevent the underflow and overflow of buffers in a video encoder processing said video image and a video decoder receiving said video image; wherein:

said target bit rate is adjusted in accordance with variable lower and upper bounds for each frame;

said target bit rate is maintained within said lower and upper bounds according to the parameters $$T_{m,n} = \frac{N}{N-1}\left(\sum_{n'=n}^{n+N'-1} R^c_{m,n'} + \frac{1}{N}\sum_{n''=n-N+1}^{n-1} R_{m,n''} - B^e_{m,n} - B^d_{\max}\right) \le R_{m,n}$$

if $T_{m,n} < \sum_{n'=n}^{n+N'} R^c_{m,n'} - B^e_{m,n} - B^d_{\max}$ or $\sum_{n'=n}^{n+N'-1} R^c_{m,n'} - B^e_{m,n}$ if $T_{m,n} > \sum_{n'=n}^{n+N'-1} R^c_{m,n'} - B^e_{m,n}$ or $T_{m,n}$ otherwise, the quantity 2N is the number of frames in a joint group of pictures (GOP), $$R^c_{m,n}$$

is the number of bits transmitted for channel m during the nth frame period, $$B^e_{m,n}$$

is the fullness of a virtual encoder buffer for channel m at the frame instant of n, $B^d_{max}$ is the maximum fullness of a decoder buffer of said video decoder, and N' is a decoding delay of said video decoder; and all of the terms in the lower bound are determinable at the video encoder.

31. A method for balancing a quality ratio between a plurality of channels of a stereoscopic video sequence, comprising the steps of:
(a) determining a complexity measure for each of said channels; and
(b) allocating a number of bits representing said video sequence between said channels according to each channel's complexity; wherein:
said channels carry successive image frames of said stereoscopic video sequence;
the complexity measure of a channel is based on the complexity (C) of the image frames carried by the channel; and
said allocating step is responsive to a target bit rate $T_{m,n}$ assigned to each frame based on the complexity (C) of the frame, where m is a channel index and n is a frame index; and
(c) controlling said target bit rate to prevent the underflow and overflow of buffers in a video encoder processing said video image and a video decoder receiving said video image; wherein:
said target bit rate is adjusted in accordance with variable lower and upper bounds for each frame; and
said target bit rate is maintained within said lower and upper bounds according to the parameters:

$$T_{m,n} = \begin{cases} \sum_{n'=n}^{n+N'} R^c_{m,n'} - B^e_{m,n} - B^d_{max} & \text{if } T_{m,n} < \sum_{n'=n}^{n+N'} R^c_{m,n'} - B^e_{m,n} - B^d_{max} \\ \sum_{n'=n}^{n+N'+1} R^c_{m,n'} - B^e_{m,n} & \text{if } T_{m,n} > \sum_{n'=n}^{n+N'-1} R^c_{m,n'} - B^e_{m,n} \\ T_{m,n} & \text{otherwise} \end{cases}$$

where the quantity $R^c_{m,n}$ is the number of bits transmitted for channel m during the nth frame period, $B^e_{m,n}$ is the fullness of a virtual encoder buffer for channel m at the frame instant of n, $B^d_{max}$ is the maximum fullness of a decoder buffer of said video decoder, and N' is a decoding delay of said decoder buffer.

32. A method in accordance with claim 31 comprising the further step of predetermining the transmission rates for future frames of channel m to ensure that:
(i) an average input rate to the decoder buffer will be equal to an average output rate thereof, and
(ii) a total transmission rate of left and right stereoscopic channels is equal to a total available channel rate.

33. A method in accordance with claim 32 wherein the transmission rate for a frame n of channel m is set equal to the average number of compressed bits for each of N previous frames.

34. A method in accordance with claim 33 wherein 2N is the number of frames in a joint group of pictures (GOP).

35. An apparatus for balancing a quality ratio between a plurality of channels of a stereoscopic video sequence, comprising:
means for determining a complexity measure for each of said channels; and
means for allocating a number of bits representing said video sequence between said channels according to each channel's complexity; wherein:
said channels carry successive image frames of said stereoscopic video sequence;
the complexity measure of a channel is based on the complexity (C) of the image frames carried by the channel; and
said allocating means is responsive to a target bit rate $T_{m,n}$ assigned to each frame based on the complexity (C) of the frame, where m is a channel index and n is a frame index; and
means for controlling said target bit rate to prevent the underflow and overflow of buffers in a video encoder processing said video image and a video decoder receiving said video image; wherein:
said target bit rate is adjusted in accordance with variable lower and upper bounds for each frame; and
said target bit rate is maintained within said lower and upper bounds according to the parameters:

$$T_{m,n} = \begin{cases} \sum_{n'=n}^{n+N'} R^c_{m,n'} - B^e_{m,n} - B^d_{max} & \text{if } T_{m,n} < \sum_{n'=n}^{n+N'} R^c_{m,n'} - B^e_{m,n} - B^d_{max} \\ \sum_{n'=n}^{n+N'+1} R^c_{m,n'} - B^e_{m,n} & \text{if } T_{m,n} > \sum_{n'=n}^{n+N'-1} R^c_{m,n'} - B^e_{m,n} \\ T_{m,n} & \text{otherwise} \end{cases}$$

where the quantity $$R^c_{m,n}$$

is the number of bits transmitted for channel m during the nth frame period, $$B^e_{m,n}$$

is the fullness of a virtual encoder buffer for channel m at the frame instant of n, $B^d_{max}$ is the maximum fullness of a decoder buffer of said video decoder, and N' is a decoding delay of said decoder buffer.

* * * * *